March 9, 1971  R. A. D. SCHWARTZ ET AL  3,568,253
THERMOFORMING APPARATUS
Filed Aug. 15, 1968  5 Sheets-Sheet 1

INVENTORS
ROBERT A. D. SCHWARTZ
BARRY DEP
BY  ROBERT L. HALL

*Gardner & Zimmerman*
ATTORNEYS

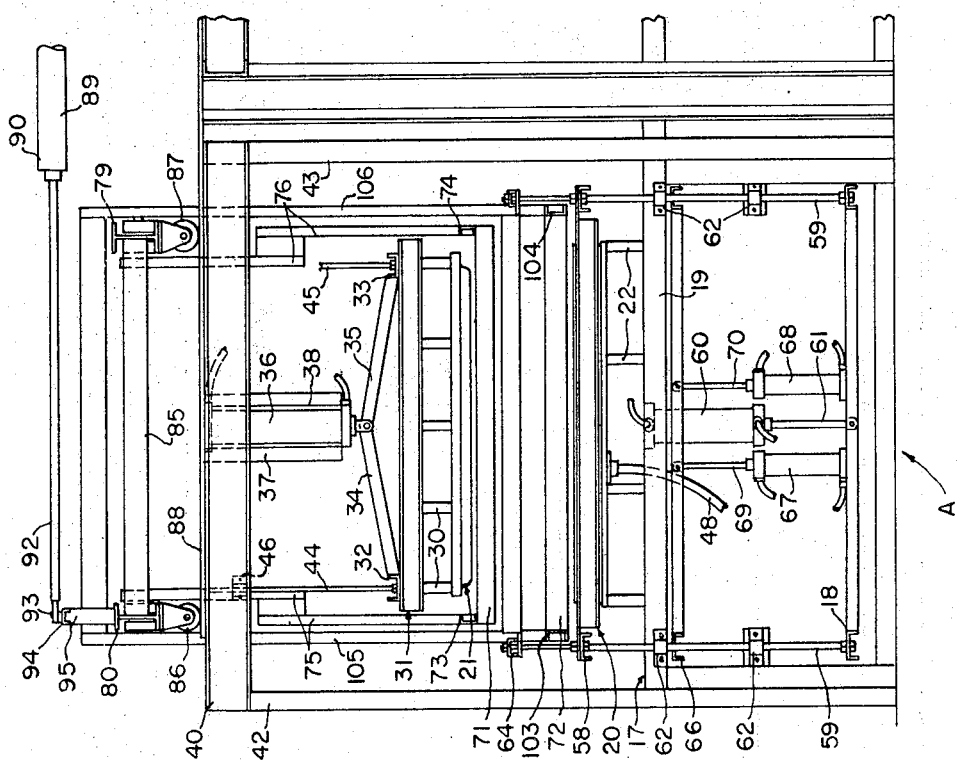
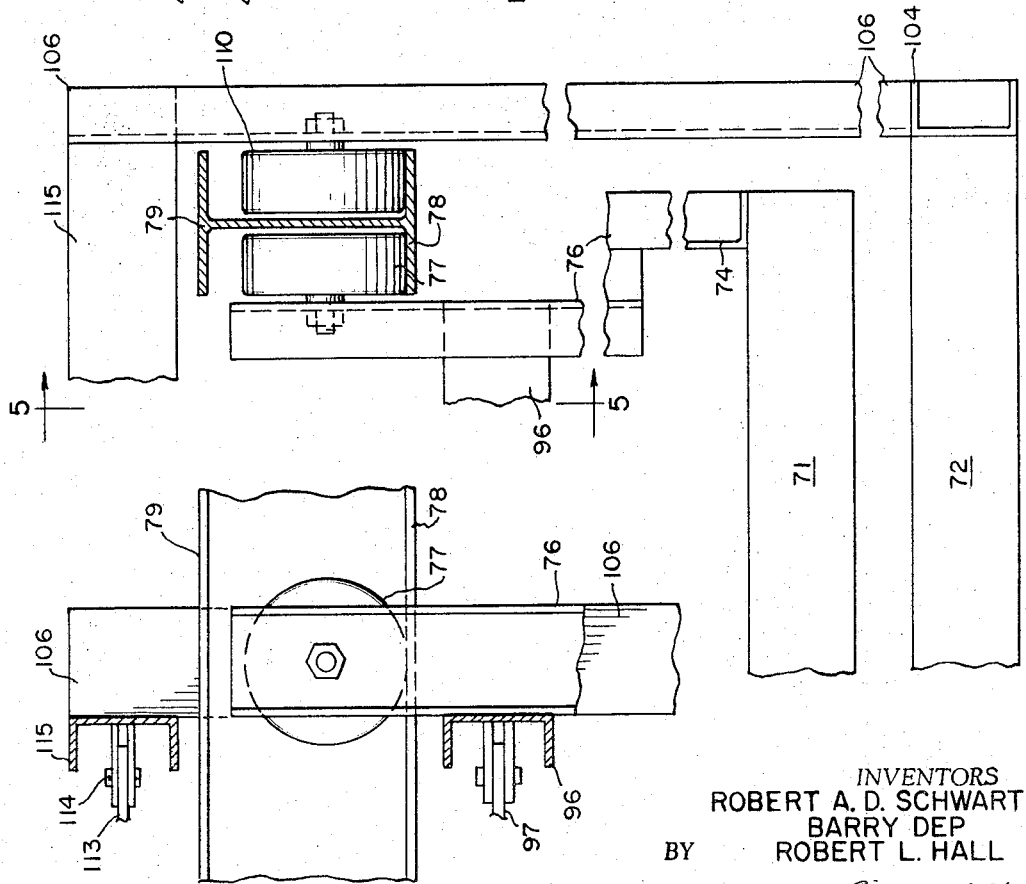
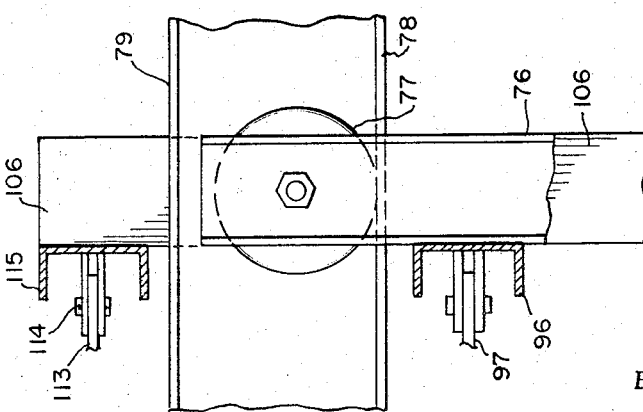
FIG. 3
FIG. 4
FIG. 5
INVENTORS
ROBERT A. D. SCHWARTZ
BARRY DEP
BY ROBERT L. HALL
ATTORNEYS

INVENTORS
ROBERT A.D. SCHWARTZ
BARRY DEP
BY   ROBERT L. HALL

Gardner & Zimmerman
ATTORNEYS

United States Patent Office 3,568,253
Patented Mar. 9, 1971

3,568,253
THERMOFORMING APPARATUS
Robert A. D. Schwartz, Oakland, and Barry Dep and Robert L. Hall, San Leandro, Calif., assignor to United Plastics Corporation, Oakland, Calif.
Filed Aug. 15, 1968, Ser. No. 752,980
Int. Cl. B29c 17/04
U.S. Cl. 18—19
4 Claims

ABSTRACT OF THE DISCLOSURE

The apparatus includes frame structure providing a plurality of angularly spaced stations radially disposed with respect to the retracted position of a pair of heating elements reciprocable between such retracted position and extended positions at one or another of such stations so as to heat a sheet of material located thereat concurrently from the opposite sides thereof. Each of the forming stations is equipped with clamping mechanism selectively movable between open and closed positions to engage a sheet of material at the station along its perimetric edge portions and clamp the sheet in a generally horizontal orientation. Each of the forming stations is provided with platen structure comprising male and female platens cooperative with a heated sheet of material to deform the same mechanically toward its final configuration, and each of the female platens is equipped with means for reducing the pressure therewithin to enable the sheet of material to be deformed by a pressure differential thereacross into the final configuration intended therefor.

DISCLOSURE

This invention relates to a method of and apparatus for molding sheets of thermoplastic material and the like, and it relates more particularly to a method of and apparatus for thermoforming such materials.

Thermoforming techniques are generally well known, and ordinarily include the operations of applying heat to sheets of thermoplastic materials to soften the same and then of deforming the heated sheet to the final configuration intended therefor by creating a pressure differential across the sheet to cause it to conform to the shape of the platen surface or surfaces defining such configuration. Various thermoforming machines have been developed in which structural and mechanical requirements have been simplified and reduced such as by increasing the frequency of use of intermittently operable components. As an example, molds or platens are provided for selective displacement into cooperative relation with a heating element which elevates the temperature of the sheets of material respectively supported in superposed relation with the platens, wherefore the heating element which otherwise would be used infrequently is in substantially continuous use.

An object of the present invention is to provide an improved method of and apparatus for thermoforming thermoplastic materials and the like in which a plurality of adjacent platen stations are serviced by a single heating means to permit a single operator positioned adjacent such stations to feed sheets of material to each station and remove the formed objects constructed thereat. Another object of the invention is in the provision of an improved thermoforming arrangement which enables different products or molded shapes to be formed at the same time, and which also enables continued use of one or more product-forming platens while the use of another may be selectively discontinued temporarily or for interchange with another platen to enable yet another different product to be produced. Additional objects and advantages of the invention, especially as concerns particular features and characteristics thereof, will become apparent as the specification develops.

In one of its aspects, and considering an exemplary structural embodiment of the invention, frame structure is provided that defines a plurality of angularly spaced forming stations radially disposed with respect to an origin generally constituting the retracted position of a pair of facing, vertically spaced heating elements supported by the frame structure for reciprocable displacements between such retracted position and a plurality of extended positions respectively aligned with the forming stations so as to be selectively disposed thereat along opposite sides of a sheet of material located at the selected station to heat the sheet from its opposite sides concurrently. At each such forming station, a sheet of material is adapted to be formed into a predetermined configuration, and each station is equipped with clamping mechanism for engaging a sheet of material along the perimetric edges thereof to constrain the same in a generally horizontal disposition. Each of the forming stations is also provided with a pair of spaced apart male and female platens defining platen structure cooperative with a sheet of heated material to mechanically deform the same toward its final configuration. Associated with each of the female platens are means for reducing the pressure therein to a sub-atmospheric value so as to create a pressure differential across a juxtaposed sheet of material to deform the same into the final configuration intended therefor.

An embodiment of the invention is illustrated in the accompanying drawings, in which:

FIG. 3 is a broken front view in elevation of one of the forming stations looking thereat from right to left in FIG. 1;

FIG. 4 is an enlarged, broken vertical sectional view taken along the line 4—4 of FIG. 2;

FIG. 5 is a broken vertical sectional view taken along the line 5—5 of FIG. 4;

Figure 1:
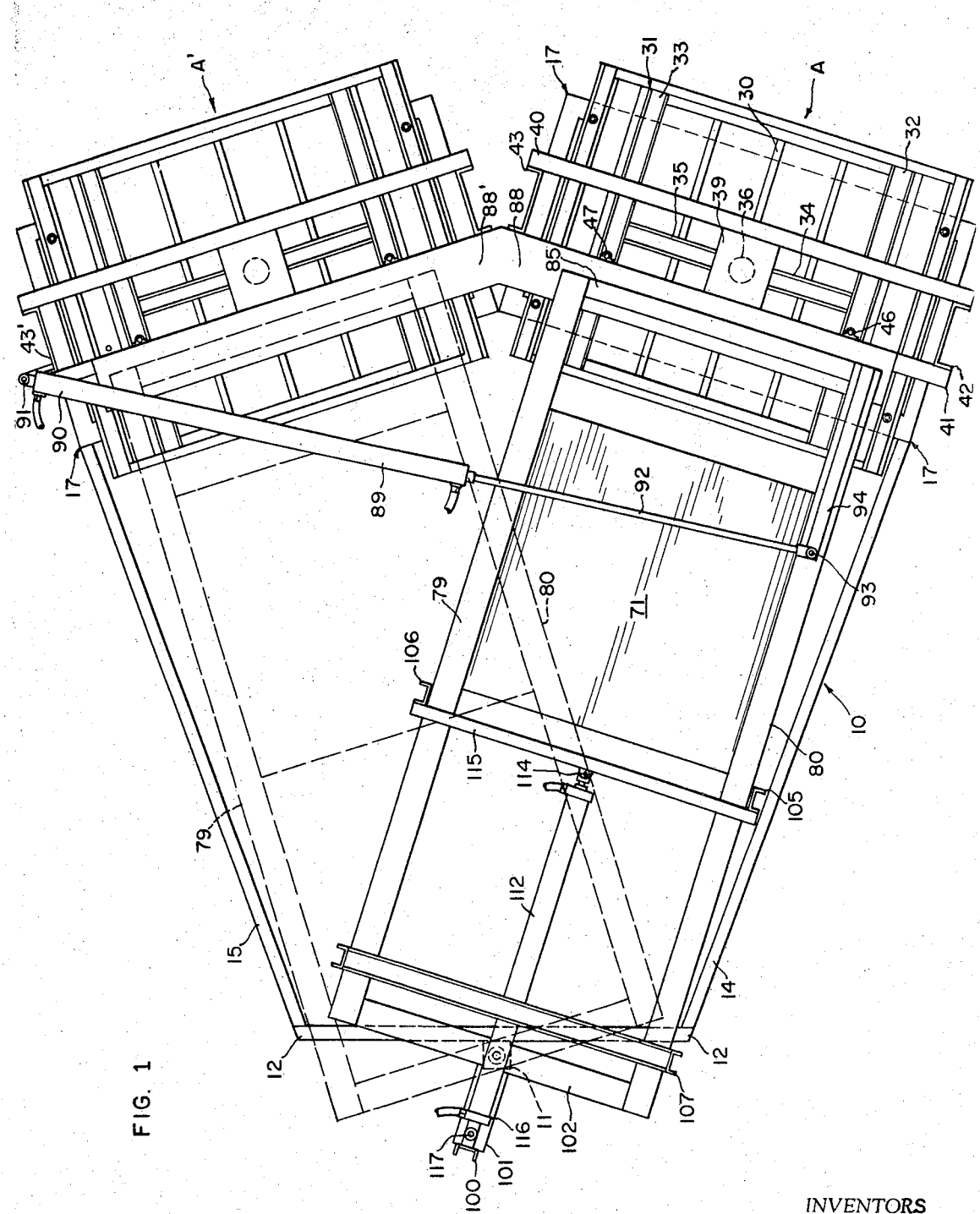
FIG. 1 is a top plan view of thermoforming apparatus embodying the invention.

The particular embodiment of the apparatus illustrated in the drawings comprises frame structure denoted in its entirety with the numeral 10 and defining a plurality of adjacent forming stations generally indicated in FIG. 1 by the letters A and A'. The forming stations A and A' are angularly spaced from each other and are radially disposed with respect to an origin generally established by an upwardly extending post 11. While in the specific apparatus being considered only two forming stations are provided, any suitable number can be included. It may be observed that the forming stations A and A' are substantially identical, except that the platen structure (described hereinafter) with which each station is equipped may differ because it is not necessary that the same product or that products having the same configuration be fabricated concurrently by the apparatus. As a result of the structural and functional correspondence of the stations A and A', the details of only one such station will be particularized herein.

Figure 2:
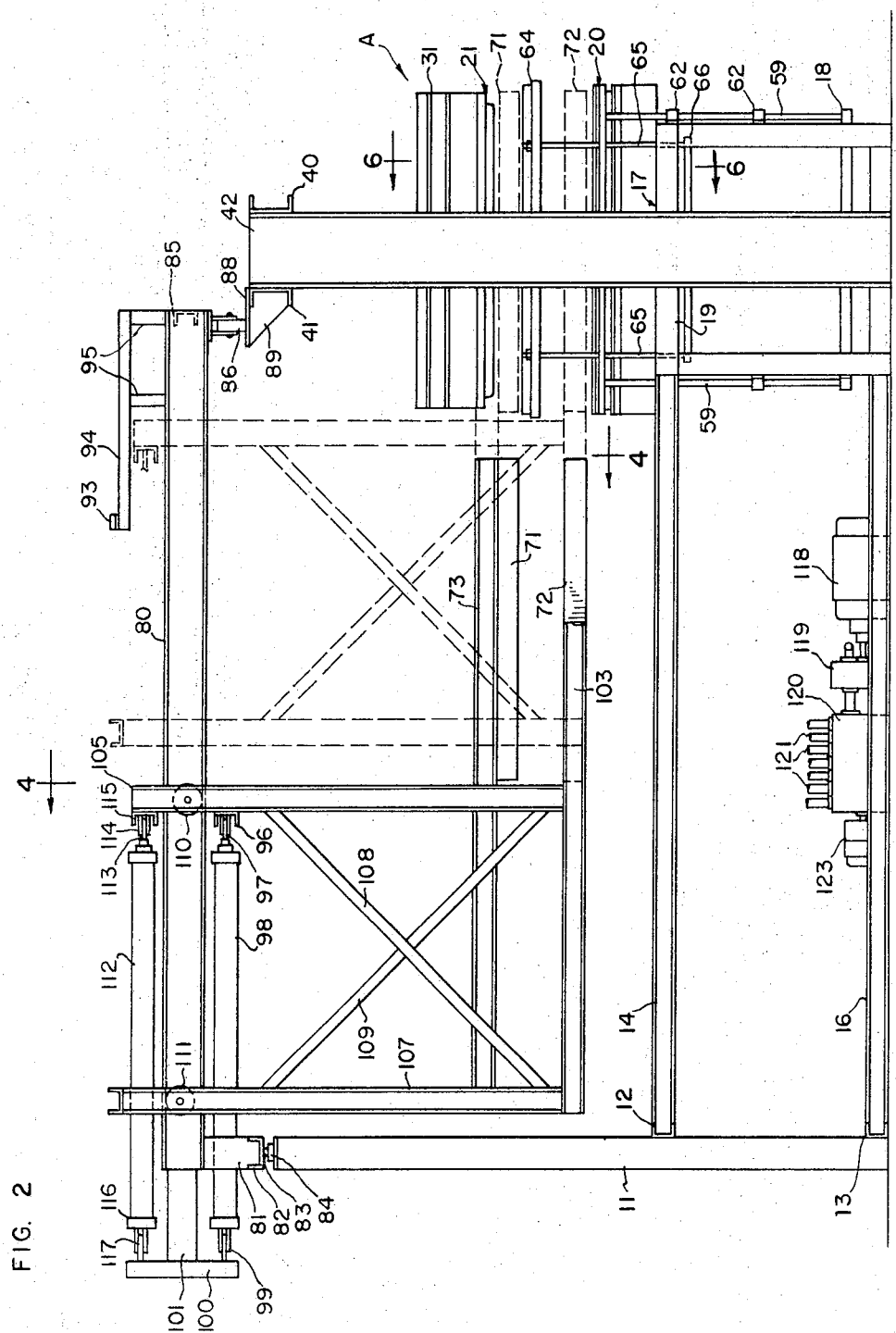
FIG. 2 is a side elevation of the apparatus shown in FIG. 1.

As shown best in FIGS. 1 and 2, the frame structure 10 comprises upper and lower channels 12 and 13 that are transversely disposed in spaced apart parallelism and are welded or otherwise rigidly secured to the upright post 11. Extending forwardly from the upper channel 12 and diverging outwardly are a pair of longitudinally disposed channel-shaped frame members 14 and 15 which constitute the outer longitudinal extremities of the frame structure. Respectively associated with the frame members 14 and 15 are lower frame members aligned in parallelism therewith, one of which is shown in FIG. 2 and is noted with the numeral 16. The longitudinal frame members 14 and 16 are fixedly connected at their forward ends to a table-like platform structure 17 having a plurality of depending legs to which is secured an upper support structure 19. The platform 17 is spaced longitudinally from the upright post 11, and comprises a part of the forming station A.

Figure 6:
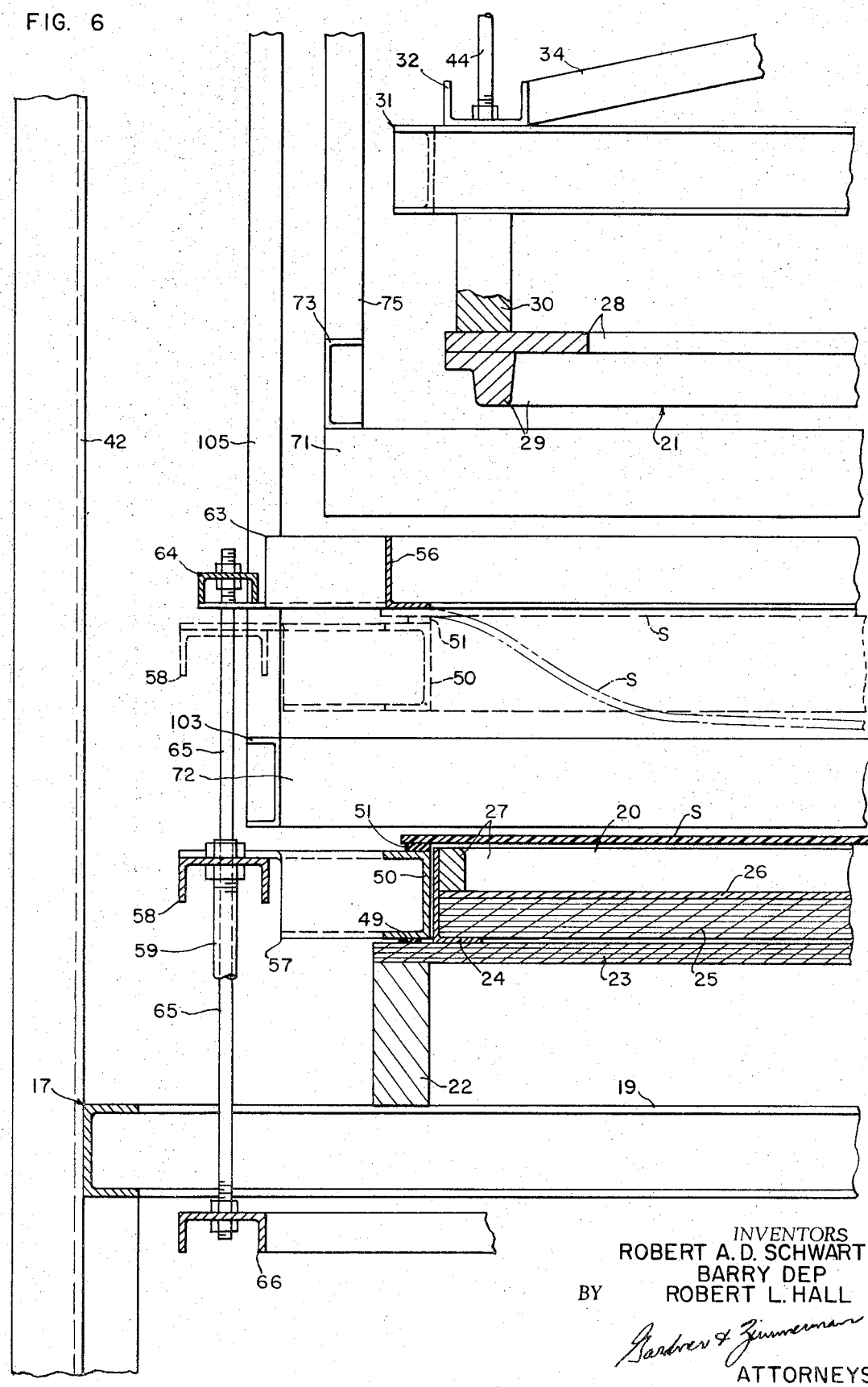
FIG. 6 is an enlarged, broken vertical sectional view taken along the line 6—6 of FIG. 2 showing the platen structure in the open position thereof.
Figure 7:
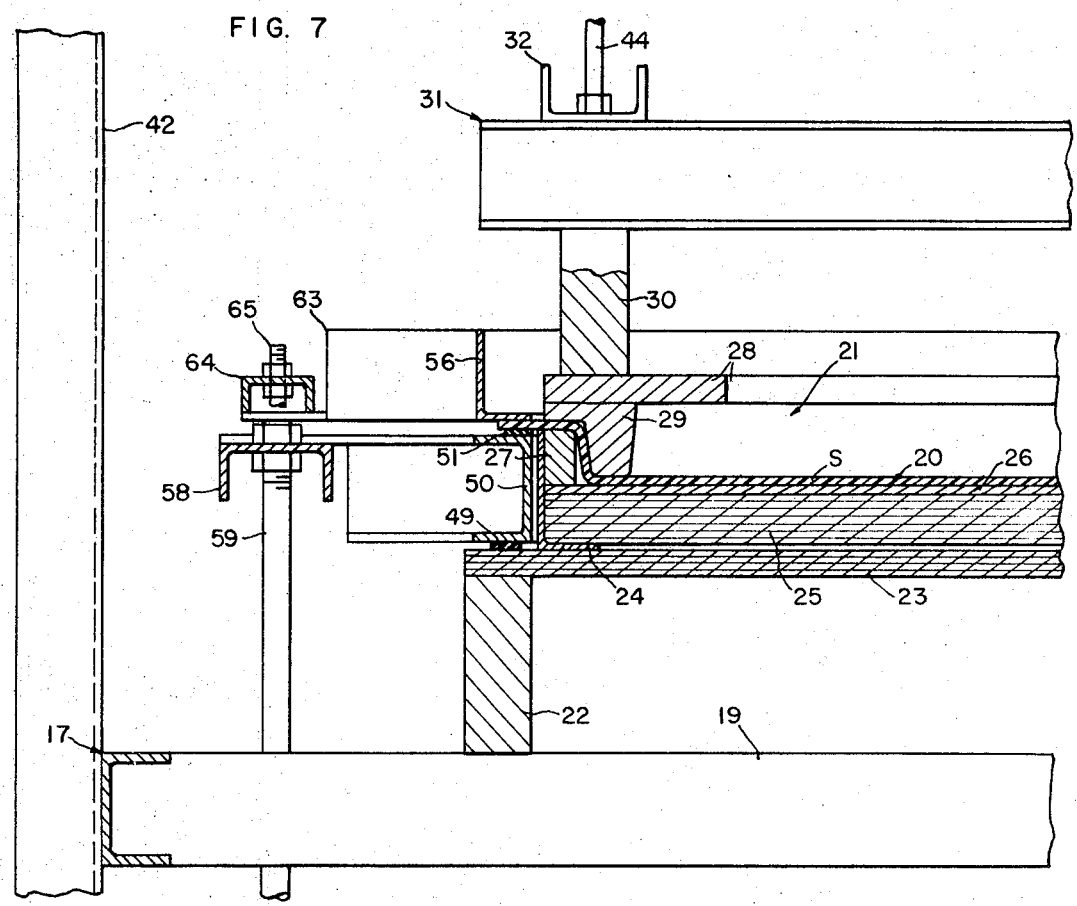
FIG. 7 is an enlarged, broken vertical sectional view similar to that of FIG. 6 but showing the platen structure in its closed position.

Referring particularly to FIGS. 3, 6 and 7, the apparatus is seen to provide at the forming station A platen structure comprising lower and upper platen components 20 and 21 which are normally spaced apart, as shown in FIG. 6, but are adapted to be brought into cooperative juxtaposition by downward displacement of the upper platen component 21, as shown in FIG. 7. The lower platen component 20 is a female component and is fixedly carried by the upper support structure 19 through a plurality of transversely spaced joists 22 that seat upon the support structure 19 and receive on their upper edges a generally planar support or platform 23. The platform component 20 seats upon the platform 23 and comprises a generally L-shaped perimetric frame 24, the horizontal flange of which underlies a floor or bottom wall 25 equipped along the upper surface thereof with a substantially smooth cover 26 forming a part of the platen or die surfaces. Extending upwardly from the surface 26 are a plurality of die or platen elements 27 which together with the surface 26 establish the configuration to be enforced upon each sheet of plastic material by the thermoforming thereof. Such a sheet of material is illustrated in FIG. 6 in overlying relation with the platen component 20 and is denoted with the letter S.

The lower female platen component 20 is intended to be stationary, and upper platen component 21, when required is a male component and is selectively movable between the upper open position shown in FIG. 6 in which it is spaced from the lower platen and the lower closed position illustrated in FIG. 7 in which it engages the sheet S and in cooperation with the platen 20 mechanically deforms the sheet toward the final configuration thereof. The male platen component 21 includes a generally planar perimetric frame 28 to which is secured a plurality of depending platen elements 29. Such elements 29, as shown in FIG. 7, matingly cooperate with the platen components 27 in deforming the sheet S toward its final configuration.

The perimetric frame 28 is secured to a plurality of transversely spaced joists 30 carried by channel structure 31 equipped at transversely spaced locations along the upper surface thereof with a pair of longitudinally oriented channels 32 and 33 to which are respectively affixed a pair of upwardly and inwardly converging struts or truss members 34 and 35 which at their inner ends are connected to the piston-equipped rod of piston-cylinder structure 36 defining fluid motor means. The cylinder of such motor means 36 is fixedly constrained by a pair of depending supports 37 and 38 which at their upper ends are rigidly related to a plate 39 welded or otherwise mounted upon a pair of transversely disposed frame members 40 and 41 which (as shown in FIG. 2) are welded or otherwise attached to a pair of upwardly extending channels 42 and 43 forming a part of the frame structure of the apparatus and secured adjacent the lower ends thereof to the table-like platform 17.

The fluid motor means 36 which may be hydraulically actuated, is effective to displace the struts 34 and 35 downwardly whereupon the frame structure 31, joists 30 and upper platen component 21 are displaced downwardly therewith toward the lower platen 20. The piston-cylinder structure 36 defining the motor means is double-acting, as indicated by the conduits shown in FIG. 3, which connect with opposite ends of the cylinder, and, therefore, alternate pressurization of these conduits causes the motor means to reciprocate the platen 21 and associated structure between the upper retracted and lower extended positions thereof. Such vertical displacements of the platen component 21 and elements moved therewith are stabilized by a pair of guide rods 44 and 45 which at their lower ends are respectively bolted to the channels 32 and 33 and extend upwardly therefrom for slidable cooperation with bearings 46 and 47 supported by the channel 41. As is evident in FIG. 1, the bearings 46 and 47 together with the guide rods 44 and 45 respectively associated therewith are offset longitudinally from the center of the piston-cylinder structure 36 for the purpose of increasing the stability they afford.

As concerns the platens 20 and 21 and the specific function thereof in forming the sheet S of material into the configuration intended therefor, the platens may be conventional, and in this respect not only tend to deform the sheet by mechanical cooperation toward the final configuration thereof but also enforce such configuration thereon by creating of pressure differential across the sheet or between the opposite sides thereof. In the particular apparatus being considered, such pressure differential is developed entirely by vacuumizing or creating a sub-atmospheric pressure within the lower female platen 20 beneath the undersurface of the sheet S, although the effects of such reduced pressure could be augmented by having an elevated or super-atmospheric pressure developed within the upper male platen 21 above the upper surface of the sheet S. In FIG. 3, the lower platen 20 is seen to have a conduit 48 connected thereto which is adapted to be connected to a vacuum pump or other source of reduced pressure and thereby vacuumizes the interior of the platen through a plurality of apertures (not shown) within the bottom wall 25 and cover 26 therealong that form a part of the platen. Since, as indicated hereinbefore, such a platen and the vacuumizing arrangement therefor are conventional, they need not be further considered.

It may be noted, however, as shown in FIGS. 6 and 7, that a perimetric seal 49 generally bordering the lower platen 20 seats upon the platform 23 and is engaged by a generally U-shaped channel 50 that is also perimetrically extending and generally borders the platen 20, wherefore the seal 49 in cooperation with the platform 23 and frame 50 facilitates the development of a reduced pressure within the platen 20. In an analogous manner, the channel 50 along the upper flange thereof is provided with a perimetric seal 51 that also generally borders the platen 20 since it extends along the channel and it seats thereon the perimetric edge portions of the sheet S so that it also facilitates development of a reduced pressure within the platen 20.

Figure 8:
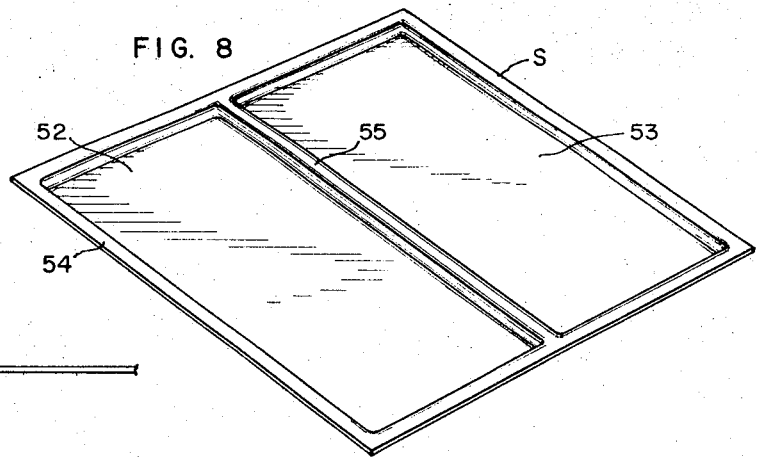
FIG. 8 is a perspective view of a thermoformed sheet of material showing the configuration enforced thereon by the platen structure incorporated in the embodiment of the invention illustrated.

The channel 50 forms a part of the clamping mechanism located at the forming station A and effective to grip each sheet S thereat along its perimetric edge portions to constrain the same in a generally horizontal disposition during the steps of heating the sheet and thereafter molding the same into the intended configuration therefor. As shown in FIG. 8, a form for the sheet may constitute a plurality of generally rectangular dish-shaped concavities, there being two in the particular illustration respectively denoted with the numerals 52 and 53. The perimetric edge portions of the sheet bordering such concavities are generally denoted with the numerol 54, and the two concavities 52 and 53 are separated by a divider 55 which effectively constitutes a part of the edge portions 54. Comparing sheet S in its final configuration (as shown in FIG. 8) with the closed position of the platens 20 and 21 shown in FIG. 7, it will be evident that the perimetric edge portions 54 of the sheet are formed at least in part by the juxtaposed surfaces of the platen elements 27 and 29 and that the concavities 52 and 53 are located between such elements. It will be apparent that cooperative platen elements (not shown) are provided by the platens 20 and 21 to form the divider 55.

The channel 50 constitutes the lowermost gripper component of a pair thereof forming the aforementioned clamping mechanism, and such gripper components are vertically reciprocable relative to each other for the purpose of selectively gripping therebetween the perimetric edge portions of a sheet S, and the gripper components are also vertically displaceable in unison to selectively position such gripped sheet at a heating location and at a location along the lower platen 20 for the forming operation. The upper gripper component cooperative with the lower channel-shaped gripper component 50 is denoted with the numeral 56, and is a generally L-shaped channel that is perimetrically extending relative to the platens 20 and 21 and the horizontal flange of which is adapted to engage the outer edge portion of the sheet S and clamp the same against the upper flange of the gripper component 50 through the seal 51 carried thereby. Such clamping orientation of the channel-shaped gripper components 50 and 56 is shown by full lines in FIG. 7 (in which the sheet S is cooperatively engaged by the platens 20 and 21) and in part by broken lines in FIG. 6 in which the lower gripper component 50 is shown in an upper position in cooperative engagement with the gripper component 56 to support the sheet S during the heating operation, which will be described subsequently.

The lower gripper component 50 is supported at a plurality of spaced apart locations (four, for example) by brackets rigidly secured to the clamping component 50 and which in port overlie and are fixedly attached to a pair of inverted U-shaped support channels 58 that are longitudinally disposed and extend along the opposite longitudinal edges of the perimetric clamping component 50. Each of the two support channels 58 is supported at spaced apart locations by a pair of rods 59 that are threaded at the end portions thereof and at their upper ends are equipped with nuts that secure the same to the channels 58. At their lower ends, the rods 59 (see FIGS. 2 and 3) are secured by nuts to a lower support structure 18, wherefore such support structure carries and determines the position of the lower clamping component 50 through the rods 59 and channels 58.

The lower support structure 18 is movably carried by fluid motor means 60 in the from of a piston-cylinder structure which may be hydraulically actuated and is a two-way device so that the piston thereof can be positively displaced in either direction. The cylinder of the motor means 60 is fixedly secured to the stationary upper support structure 19 and is therefore immovable, but the piston-equipped rod 61 is secured to the lower support structure 18 and is therefore effective to displace the same upwardly and downwardly between the lower position thereof shown in FIGS. 2, 3 and 7 and the upper position shown by broken lines in FIG. 6. Such vertical reciprocations of the lower support structure 18 and components carried thereby are guidde and constrained by the rods 59 which slidably extend through a plurality of bearings 62 as illustrated in FIG. 3, there being two such bearings associated with each rod.

The upper gripper component 56 is similarly supported and is therefore provided with a plurality of brackets 63 rigidly attached thereto and which underlie and are fixedly secured to one or the other of a pair of inverted U-shaped support channels 64 generally aligned respectively with the lower support channels 58, as shown most clearly in FIGS. 6 and 7. Each of the channels 64 is carried by a pair of longitudinally spaced rods 65 which are threaded at each end thereof, and at their upper ends are secured by nuts to the channel 64 and at their lower ends are secured by nuts to a support frame 66, all as shown in FIG. 6.

The frame 66 (as shown in FIG. 3) is supported for reciprocable displacements along a vertical path by a pair of fluid motor means 67 and 68 in the form of piston-cylinder structures—the cylinders of which are fixedly secured to the vertically reciprocable support structure 18. The motor means are double-acting and the piston-equipped rods 69 and 70 thereof are attached to the support frame 66 so as to displace the same relative to the lower support structure 18 between the upper position shown in FIGS. 3 and 6 in which the upper clamping component 56 is elevated and the lower position in which the upper clamping component 56 is displaced downwardly to engage a sheet S supported by the lower platen 20 and lower gripping component 50, as illustrated in FIG. 7.

In a sequence of operations concerning the clamp mechanism, the lower clamp component 50 and upper clamp component 56 are initially in the vertically spaced positions thereof shown by full lines in FIG. 6; and after a sheet S of material is positioned upon the lower platen 20 with its marginal edge portions overlying the upper flange of the clamping component 50, the motor means 67 and 68 are energized in a direction displacing the frame 66 and rods 65 downwardly so as to lower the upper clamping component 56 into cooperative engagement with the lower clamping component 50 and thereby constrain a sheet S of material therebetween. Thereafter, the motor means 60 is energized in a direction retracting the rod 61 thereof so as to elevate the support structure 18 and rods 59 and thereby lift the lower clamping component 50, together with the upper clamping component 56 and sheet S positioned between the two components, into the elevated position shown in FIG. 6 by the full-line illustration of the upper clamping component 56 and broken-line illustration of the lower clamping component 50.

Following the heating operation which will be described subsequently, the motor means 60 is energized in the opposite direction to lower the clamping components 50 and 56 into the lower position thereof shown in FIG. 7 so that the lower and upper platens 20 and 21 can be brought into cooperative engagement and deform the sheet S toward the final configuration thereof ultimately enforced upon the sheet by vacuumizing the lower platen 20, as heretofore explained. After such forming operation has been completed and the upper platen 21 retracted, the upper clamping component 56 is returned to the elevated position thereof shown in FIG. 6 to release the formed sheet and permit it to be removed from the apparatus.

A pair of heating elements is provided by the apparatus so as to apply heat concurrently to the opposite sides of a sheet S, and the heating elements are spaced apart vertically and comprise an upper heating element 71 and lower heating element 72. As shown in FIG. 6, the spacing between the heating elements 71 and 72 is sufficient to accommodate the clamping components 50 and 56 in their closed position with a sheet S constrained therebetween. As respects the present invention, the heating elements 71 and 72 may be completely conventional and, accordingly, in the usual instance will be electrically energized and thermostatically controlled so as to maintain the temperature thereof relatively uniform at any value selected from a predetermined range thereof. Accordingly, no details concerning the heating elements are included.

The heating elements are reciprocable between a retracted position shown by full lines in FIGS. 1 and 2 in which the elements, or the transports therefor, are located radially inwardly from the forming station A at a position close to the post 11 (i.e., approximating the origin of the radial distance inwardly from the forming station A) and an extended position at the station A in which the heating elements are respectively positioned above and below a sheet S when in the elevated position thereof shown by broken lines in FIG. 6. The heating elements must be retracted whenever the clamping mechanism constraining a sheet S is displaced between the upper and lower positions thereof, and also whenever the upper platen 21 is displaced vertically between the retracted position shown in FIG. 6 and the extended position thereof in cooperation with the lower platen 20, as shown in FIG. 7. As concerns reciprocable displacements of the heating elements between their extended and retracted positons, it should be observed that the elements are independently displaceable and, as explained hereinafter, the lower element 72 may be retracted prior to return of the upper heating element 71 to its retracted position.

As shown best in FIGS. 2, 4 and 6, the upper heating element 71 is secured along the opposite longitudinal edges thereof to the front halves of a pair of longitudinally spaced carrier beams 73 and 74 which are about twice as long as the heating element 71 and project rearwardly therefrom for connection to a pair of longitudinally spaced hangers—the forward hangers of which are shown in FIG. 3 and are respectively denoted 75 and 76. Referring now to FIG. 4 in particular, each of the hangers is equipped adjacent the upper end thereof with a roller or wheel 77 that rides along the inwardly directed portion of the lower flange 78 of an I-beam that defines a track from which the respectively associated hangers 75 and 76, carriers 73 and 74 and upper heating element 71 are supported for reciprocable displacements longitudinally along the track between the retracted and extended positions described. As shown in FIG. 1, two such track-defining I-beams are provided in transversely spaced parallelism and they are respectively denoted with the numerals 79 and 80.

At their rearward ends, the I-beams or rails 79 and 80 are respectively secured through depending brackets 81 to a transversely extending support channel 82 equipped intermediate the ends thereof with a pivot pin 83 cooperatively supported by a bearing 84 which enables the pivot pin to be displaced angularly about the axis thereof, thereby enabling the heating elements to be respectively aligned with the forming stations A and A' as will be described hereinafter. At their forward ends, the I-beams or rails 79 and 80 are rigidly interconnected by a transversely extending channel 85, and each rail is equipped at such forward end with a roller or wheel (respectively denoted 86 and 87) which engage and are supported by a track-defining rail 88 connected at spaced apart locations through webs or brackets 89 to the aforementioned frame member 41. As illustrated in FIG. 1, the track 88 extends across the forming station A and has an angularly oriented continuation extending across the forming station A'. For purposes of positive identification, and differentiation, such angular extension is denoted in FIG. 1 with the numeral 88'.

The I-beams or rails 79 and 80 are angularly displaceable between the full-line and broken-line positions shown in FIG. 1 so as to selectively align such rails and the heating elements 71 and 72 carried thereby with the forming stations A and A'. Such angular displacements are enforced upon hte rails 79 and 80 through fluid motor means, generally denoted 89, in the form of piston-cylinder structure which can hydraulically energized and includes a cylinder 90 pivotally supported at one end thereof (as shown at 91) to the fixed frame structure of the apparatus and, in particular, to the channel 43' thereof. The piston-equipped rod 92 of the motor means is pivotally connected at its outer free end (as shown at 93) to a fixed arm 94 rigidly attached to the I-beam 80, as shown in FIG. 2, by a plurality of upwardly extending brackets 95. The motor means 90 is double-acting as indicated by the connection of conduits to the opposite ends thereof; and when energized in one direction is operative to swing the rails 79 and 80 and heating elements carried thereby about the axis of the pivot pin 83 into alignment with the forming station A'; and when energized in the opposite direction aligns such heating elemetns and associated components with the forming station A.

Returning to the heating element 71 and structural assemblage supporting the same for longitudinal reciprocation along the rails 79 and 80, the forward hangers 75 and 76 are interconnected just below the rails 79 and 80 by a transverse channel 96 to which is connected the outer end of the rod 97 of a piston-cylinder structure defining a fluid motor means 98. The cylinder of the motor means 98 is connected, as shown at 99, to a vertical strut 100 fixedly secured intermediate the ends thereof to a horizontal brace 101 which is fixedly related to a transverse frame member 102 (FIG. 1) interconnecting the tracks 79 and 80 at the rearmost ends thereof. The motor means 98 is double-acting; and when energized in one direction is operative to force the piston rod 97 thereof outwardly to displace the hangers 75 and 76, carriers 73 and 74 and heating element 71 from the retracted full-line position thereof shown in FIG. 2 to the extended position illustrated by broken lines in FIG. 2 in which it is positioned at the forming station A in overlying relation with any sheet S located thereat. Energization of the motor means 98 in the opposite direction retracts the heating element 71 and associated components into the full-line position shown in FIG. 2.

The lower heating element 72 is similarly supported for longitudinal displacements between its retracted full-line position and the extended broken-line position thereof shown in FIG. 2; and for this purpose it is secured to transversely spaced and longitudinally extending carriers 103 and 104 respectively supported by spaced apart hangers—the forward two of which are illustrated in FIG. 3 and are respectively denoted with the numerals 105 and 106, and one of the rearmost of which is shown in FIG. 2 and is denoted with the numeral 107. The carrier 103 (as shown in FIG. 2) is approximately the same length as the carrier 73 and the heating element 72 is secured to the forward half of the carrier 103 in a manner analogous to the mounting of the heating element 71 on the carrier 73. The hangers 105 and 107 which extend upwardly from the carrier 103 at the rear half thereof are reinforced by angularly disposed struts 108 and 109 welded or otherwise fixedly secured thereto. In a similar manner, the hangers on the opposite side which are connected to the carrier 104 may be reinforced by cross struts, as may be the two pairs of hangers heretofore described which are associated with the upper heating element 71.

As shown in FIGS. 2 and 4 in particular, each of the forward hangers 105 and 106 is equipped adjacent the upper end portion thereof with a roller or wheel 110 that ridingly engages the outwardly projecting portion of the lower flange of the respectively associated rails 79 and 80. Correspondingly, each of the rearmost hangers is equipped with a wheel or roller 111 that also ridingly engages the upper flange of the respectively associated rails 79 and 80. Thus, the lower heating element 72 is suspended from the rails 79 and 80 through the associated wheel-equipped hangers 105, 106 and 107 and carriers 103 and 104, and is longitudinally displacable along the rails as heretofore described in connection with the upper heating element 71.

Such longitudinal displacements are enforced upon the lower heating element 72 by fluid motor means 112 in the form of a piston-cylinder structure—the rod 113 of which is connected as shown at 114 to a channel 115 that is transversely oriented and extends between and is connected to the forward hangers 105 and 106, as shown best in FIG. 1. The cylinder 116 of the motor 112 is connected (as shown at 117) to the aforementioned strut 100 which is fixedly related to the rails 79 and 80 through the horizontal brace 101 and channel 102. The motor means 112 is double-acting; and when energized in one direction, the heating element 72 is displaced from the retracted full-line position thereof shown in FIG. 2 to the extended position thereof illustrated in such figure by broken lines and in which it is disposed at the forming station A in underlying relation with any sheet S positioned thereat. Energization of the motor means 112 in the opposite direction returns the lower heating element 72 to its retracted position.

The apparatus will include conventional fluid circuitry and controls therefor; and in this respect, and as indicated in FIG. 2, the apparatus may include an electric motor 118 that drive a pump 119 supplying presurized fluid to a manifold 120 from which it is distributed to the various motor means via the plurality of flow conduits 121 connected thereto. A gear head motor 123 may be used to control the sequential operation of a control valve associated with the manifold 120 so as to effect energization of the various motor means in a predetermined cyclic sequence of operations. Since the fluid and electrical circuitry may be conventional, no further description thereof is included.

The clamping mechanism, platen structure and other components constituting the forming station A' are the same in all essential structural and functional respects as the components heretofore described in connection with the forming station A and, therefore, in the drawings the same numerals are used to identify the respectively corresponding components except that the primed form of such numerals are used in the station A' for purposes of differentiation. As indicated previously, however, the platen or die elements respectively located at the two forming stations may differ from each other so that two different products may be made at the same time by the apparatus.

Summarizing a cycle of operation, the apparatus is initially in the condition shown by full lines in FIGS. 1 through 6 in which event the clamping mechanism is open, the platens are open, the heating elements are retracted, and the application of a reduced pressure to the lower platen 20 is interrupted. When a sheet of thermoplastic material is placed in overlying relation with the lower platen 20, as shown in FIG. 6 (and assuming that the heating elements 71 and 72 are at their operating temperature), the motor means 67 and 68 are energized to displace the upper clamping component 56 downwardly until the marginal edge portions of the sheet S are constrained between the upper and lower clamping components. The motor means 60 is then energized to lift the clamping components 50 and 56 and sheet S constrained therebetween upwardly into the elevated position shown by the broken-line orientation of the sheet S in FIG. 6.

The motor means 98 and 112 are then energized to displace the heating elements 71 and 72 forwardly and into overlying and underlying relation, respectively, with the sheet S so as to apply heat thereto concurrently from the opposite sides thereof. As the temperature of the sheet S rises to a value at which the sheet begins to sag or depend downwardly toward the lower heating element 54 (as shown by the broken-line position of the sheet in FIG. 6), the motor means 112 is energized in the reverse direction to retract the lower heating element 72. The upper heating element 71 is maintained in its extended position and continues to apply heat to the sheet S from the upper side thereof until the sheet has been heated to a sufficient extent, at which time the motor means 98 is energized in the reverse direction to retract the upper heating element 71.

The motor means 60 is then reversely energized to displace the temperature-elevated sheet and clamping components 50 and 56 constraining the same downwardly toward the lower platen 20, whereupon the clamping mechanism will be in the condition shown in FIG. 7. At about the same time, the motor means 36 is energized to displace the upper platen 21 downwardly and into engagement with the sheet S to deform the same, in co-operation with the lower platen 20, toward the final configuration intended for the sheet. The requisite pressure differential is also developed across the sheet S at about this same time which, as explained heretofore, results from establishing a sub-atmospheric pressure within the lower platen 20. The sheet S rapidly cures following such forming thereof, and after curing is effected, the motor means 36 is energized in the reverse direction to retract the upper platen 21, and the motor means 67 and 68 are energized in a direction causing the upper clamping component 56 to be withdrawn from the sheet S which can then be removed from the lower platen.

During the portion of the operation subsequent to retraction of the heating elements 71 and 72, the motor means 89 may be energized to swing the rails 79 and 80 in a counter-clockwise direction (as viewed in FIG. 1) and into alignment with the forming station A', whereupon such heating elements may then be displaced into an extended position in which they are located at the station A' so as to heat a sheet of material located thereat. In this event, the operation occurring at the station A' is exactly the same as that heretofore described; and it will be evident that certain portions of the forming operations may be carried on concurrently at the stations A and A' because of the movability of the heating elements. Thus, while one forming operation is being completed at the station A, another is being initiated at the station A'; and vice versa. The heating elements and rails 79 and 80 carrying the same are cycled back and forth between the two forming stations by appropriate energizations of the motor means 89.

It will be apparent that since the forming operations at the stations A and A' are independent of each other, there is no requirement that the products respectively formed thereat be the same and, in fact, they can be quite different in configuration. Also, it is not essential that both stations be used, wherefore forming operations may be carried on sequentially at one of the stations while platens are changed at another station or it is otherwise maintained in an inoperative state.

While in the foregoing specification embodiments of the invention have been set forth in considerable detail both as to a method and structure, it will be apparent to those skilled in the art that numerous changes may be made in such details without departing from the spirit and principles of the invention. By way of example only, for some operations only a single platen and/or a single heating element may be required; and as previously mentioned, more than two platen stations may be provided within the scope of this invention.

Figure 9:
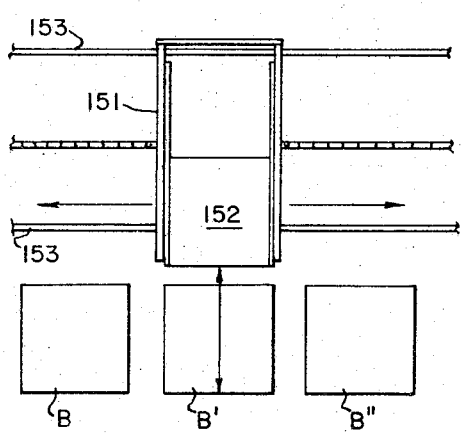
FIG. 9 is a generally diagrammatic view of another embodiment of the invention.

A modified form of apparatus is illustrated diagrammatically in FIG. 9 of the drawings. In this embodiment, three forming stations B, B' and B" are illustrated in adjacent side by side relationship. The primary distinction in this arrangement is that the frame structure 151 on which the heating elements 152 are provided, extends generally parallel to the bank or row of forming stations and is movable along rails 153 so that the heater may be selectively traversed to opposed relation with each station. Then, as in the prior embodiment, the heating means may be extended into juxtaposition with the forming station platen and sheet.

We claim:
1. In apparatus for thermoforming thermoplastic materials and the like, means defining a plurality of adjacent stationary forming stations at which a sheet of such material may be formed into a predetermined configuration, platen means at etach station, a frame structure at one side of said forming stations, heating means supported on said frame structure for rotation about a vertical axis, means on said frame structure for first sequentially moving said heating means along a first path of movement between each of said stations and for secondly extending said heating means along a second path of movement substantially normal to said first path of movement in juxta- position to said platen means whereby a sheet of material supported thereat may be heated, means for urging a heated sheet into intimate engagement with said platen for deforming the same into final configuration, said stations being substantially equal radially positioned relative to said axis, said means for moving said heating means including first means for moving the same about said axis along said first path of movement for positioning the same along a radius in alignment with selected stations, and second means for moving the heating means along said radius in said second path of movement from and towards said platen means.

2. Apparatus as set forth in claim 1 in which said stations are disposed in substantial alignment, said means for moving said heating means including first means for moving the same along said first path of movement on one side of said stations in general parallelism to the stations, and second means for moving the heating means along said second path of movement generally normal to the first direction of movement towards and from the respective stations.

3. Apparatus as set forth in claim 1 including clamping mechanism at each station being selectively movable between open and closed positions to engage such sheet of material along the perimetric edge portions thereof, said heating means including a pair of vertically spaced heating elements to reecive such sheet therebetween.

4. Apparatus as set forth in claim 3 including means for independently moving each of said heating elements along said second path of movement and reciprocating each of said heating elements between a retracted position remote from each station and an extended position located at each such station.

References Cited

UNITED STATES PATENTS

| 3,025,566 | 3/1962 | Kostur | 18—19 |
| 3,153,813 | 10/1964 | Swick. | |
| 3,256,565 | 6/1966 | Alesi et al. | 18—19 |
| 3,357,054 | 12/1967 | Hartman | 18—19 |

OTHER REFERENCES 1,158,122  6/1958  France.

J. SPENCER OVERHOLSER, Primary Examiner

J. E. ROETHEL, Assistant Examiner

U.S. Cl. X.R.

18—19